(12) United States Patent
Lu et al.

(10) Patent No.: US 8,537,648 B1
(45) Date of Patent: Sep. 17, 2013

(54) POSITION CONTROL METHOD OF OPTICAL PICKUP HEAD OF OPTICAL DISC DRIVE AND SYSTEM THEREOF

(75) Inventors: Tsung-Yu Lu, Hsinchu (TW);
Yen-Chun Lin, Hsinchu (TW);
Hung-Lung Tseng, Hsinchu (TW);
Tun-Chieh Lee, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/596,078

(22) Filed: Aug. 28, 2012

(30) Foreign Application Priority Data

Jun. 26, 2012 (CN) .......................... 2012 1 0213226

(51) Int. Cl.
*G11B 7/00* (2006.01)

(52) U.S. Cl.
USPC ................ 369/44.28; 369/44.32; 369/53.29

(58) Field of Classification Search
None
See application file for complete search history.

(56) References Cited

U.S. PATENT DOCUMENTS 5,689,482 A * 11/1997 Iida ............................ 369/44.28

* cited by examiner

*Primary Examiner* — Wayne Young
*Assistant Examiner* — Brian Butcher
(74) *Attorney, Agent, or Firm* — Jianq Chyun IP Office

(57) ABSTRACT

A position control method of an optical pickup head of an optical disc drive is provided. The optical disc drive has an optical pickup head for reading data from an optical disc and a step index for controlling the movement of the optical pickup head. The position control method includes: calculating a first position information of the optical pickup head according to the step index; reading an address information from the optical disc, calculating a second position information of the optical pickup head according to the address information; determining whether a difference between the first position information and the second position information is greater than a predetermined value; updating the step index when the difference is not greater than the predetermined value; moving the optical pickup head to an initial position when the difference is greater than the predetermined value, and setting the step index as zero.

18 Claims, 3 Drawing Sheets

POSITION CONTROL METHOD OF OPTICAL PICKUP HEAD OF OPTICAL DISC DRIVE AND SYSTEM THEREOF

CROSS-REFERENCE TO RELATED APPLICATION

This application claims the priority benefit of China application serial no. 201210213226.0, filed on Jun. 26, 2012. The entirety of the above-mentioned patent application is hereby incorporated by reference herein and made a part of this specification.

BACKGROUND OF THE INVENTION

1. Field of the Invention

The present invention relates to a position control method and a system, and more particularly relates to a position control method of an optical pickup head of an optical disc drive and a system thereof.

2. Description of Related Art

An optical disc has the advantages of reasonable price, portability, large storage capacity, easy data storage, long storage term, low cost, secure storage of data, and so on. Therefore, the optical disc has gradually replaced a conventional magnetic storage medium and becomes an indispensable optical storage medium in modern life. Because the optical disc is widely used, the optical disc player for accessing data in the optical disc becomes a common electronic product in modern life and also becomes standard equipment included by a computer.

FIG. 1 illustrates a schematic view of a conventional optical disc drive. Referring to FIG. 1, the optical disc drive 100 includes an optical pickup head 110, a lead screw 120, a spindle motor 130, a tray 140 and a step motor 150. The optical pickup head 110 is configured to access the data in the optical disc. The lead screw 120 is configured to drive the optical pickup head 110 moving along a radial direction of the optical disc. The tray 140 is configured to load and unload the optical disc. The spindle motor 130 is configured to support and rotate the optical disc. The step motor 150 is configured to rotate the lead screw 120. The "radial direction" mentioned above is the radial direction of the optical disc when the optical disc is disposed on the spindle motor 130.

When the optical disc drive is driving the optical pickup head 110 to move along the radial direction, the optical disc drive 100 transmits a step index to the step motor 150 so as to control the lead screw 120 to rotate and control the moving distance of the optical pickup head 110. In general, the step index represents the step number which the optical disc drive is moving the optical pickup head 110. The moving amount of each step number is about 6.25 μm. For example, when the step index is 500, the step motor 150 controls the lead screw 120 to rotate so the optical pickup head 110 moves 500 step numbers. That is to say, taking the moving amount of each step number is 6.25 μm for example, when the step index is 500, the optical pickup head 110 moves 3.125 mm. Therefore, the optical disc drive 100 may obtain the present radial position of the optical pickup head according to the step index so as to continuously control the optical pickup head 110 to move.

However, in the actual application conditions, during the process of the lead screw driving the optical pickup head to move, the driving error of the optical pickup head may occur due to sudden vibration or impact. Therefore, the radial position of the optical pickup head obtained according to the step index cannot accurately represent the radial position of the optical pickup head. Furthermore, the movement of the optical pickup head is mainly determined by the step index, so once the step index is different from the actual radial position of the optical pickup head, the optical disc drive can not accurately control the optical pickup head to move to the desired radial position.

SUMMARY OF THE INVENTION

The present invention provides a position control method of an optical pickup head of an optical disc drive, which can adjust the position of the optical pickup head such that the optical disc drive can precisely control the movement of the optical pickup head, so as to avoid wrongly controlling the movement of the optical pickup head so that the optical pickup head moves to an inappropriate position which leads to operation error of the optical disc drive.

A position control method of an optical pickup head of an optical disc drive is provided. The optical disc drive has an optical pickup head for reading data on an optical disc and a step index for controlling the movement of the optical pickup head. The position control method includes: calculating a first position information of the optical pickup head according to the step index; reading an address information from the optical disc, and calculating a second position information of the optical pickup head according to the address information; determining whether a difference between the first position information and the second position information is greater than a predetermined value; updating the step index when the difference is not greater than the predetermined value; moving the optical pickup head to an initial position when the difference is greater than the predetermined value, and setting the step index as zero.

A position control system of an optical pickup head of an optical disc drive is provided. The position control system includes an optical pickup head, a step motor and a control unit. The optical pickup head reads address information from an optical disc. The step motor controls the movement of the optical pickup head according to a step index. The control unit calculates a first position information of the optical pickup head according to the step index, calculates a second position information of the optical pickup head according to the address information, wherein the control unit determines whether a difference between the first position information and the second position information is greater than a predetermined value. When the difference is not greater than the predetermined value, the step index is updated. When the difference is greater than the predetermined value, the optical pickup head is moved to an initial position, and the step index is set as zero.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
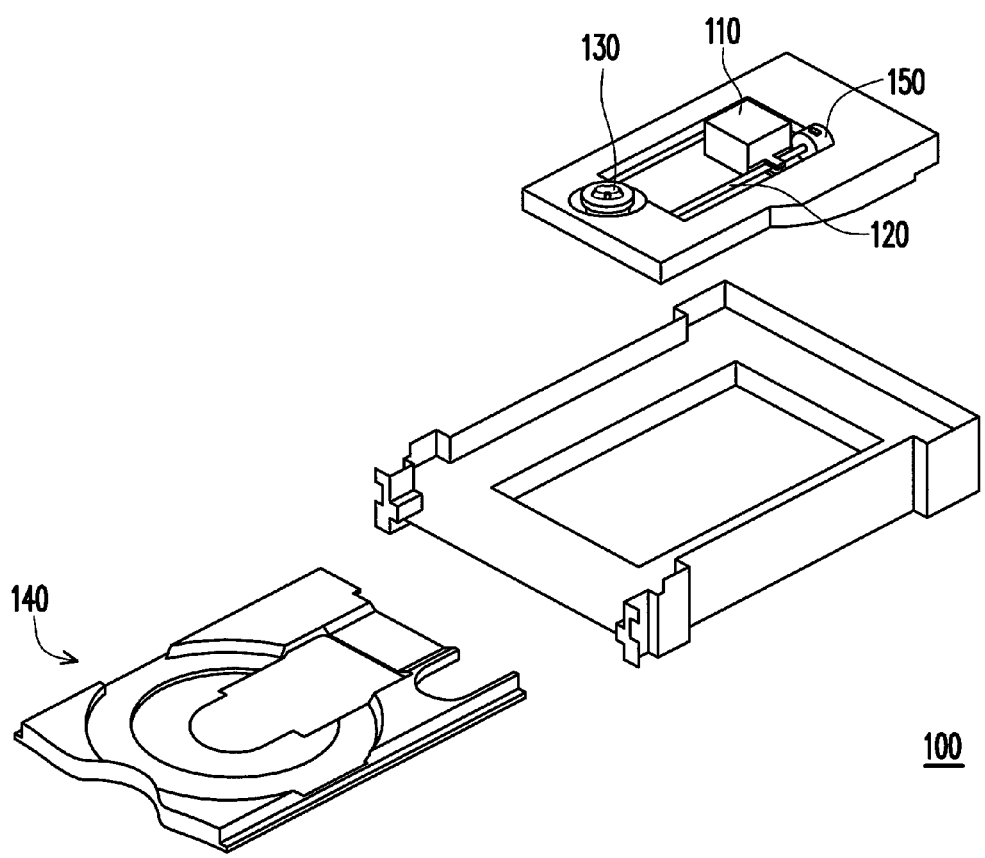
FIG. 1 illustrates a schematic view of a conventional optical disc drive.
Figure 2:
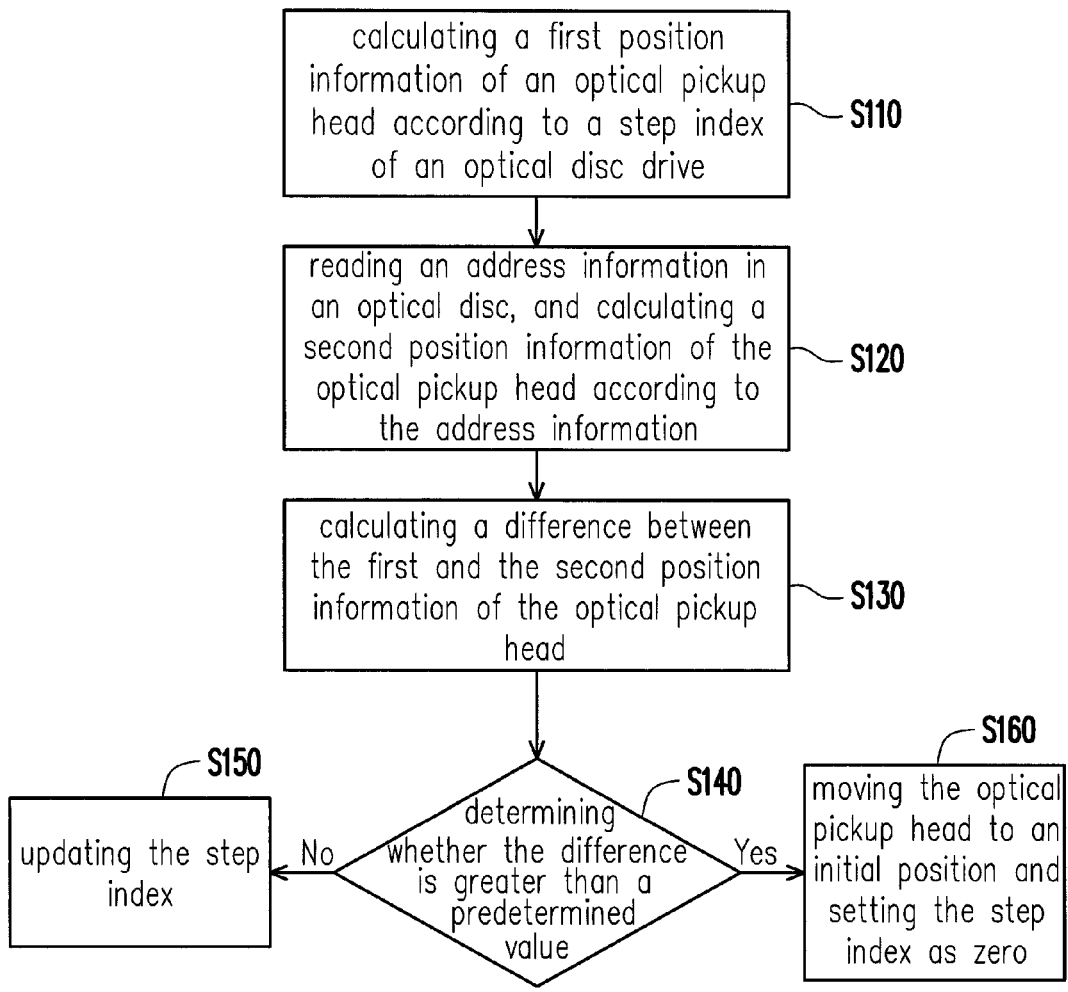
FIG. 2 illustrates a schematic flow chart of a position control method of an optical pickup head of an optical disc drive according to an embodiment of the present invention.

FIG. 2 illustrates a schematic flow chart of a position control method of an optical pickup head of an optical disc drive according to an embodiment of the present invention. Referring to FIG. 2, in the present embodiment, the position control method of the optical pickup head of the optical disc drive includes the following steps. In step S110, a first position information of the optical pickup head is calculated according to a step index of the optical disc drive. In step S120, address information is read from an optical disc, and second position information of the optical pickup head is calculated according to the address information. Herein, the present invention does not limit the performing order of step S110 and step S120. In other embodiments, the step S120 may be firstly performed and then step S110 is performed, or the two steps described above are performed simultaneously.

Next, in step S130, a difference between the first position information and the second position information of the optical pickup head is calculated. Then, in step S140, whether the difference is greater than a predetermined value is determined. When the difference is not greater than the predetermined value, step S150 is performed. In step S150, the step index is updated. When the difference is greater than the predetermined value, step S160 is performed. In step S160, the optical pickup head is moved to an initial position, and the step index is set as zero. In the present embodiment, the predetermined value is 2 mm for the purpose of illustration, which is not limited by the present invention and persons skilled in the art may define other values based on actual requirements in other embodiments.

In detail, the step index is a control parameter for the optical disc drive to control the movement of the optical pickup head. In general, the step index represents the step number which the optical disc drive moves the optical pickup head. The moving amount of each step number is a fixed value. When the step index is increased by 1, the optical pickup head is moved by the distance of the fixed value mentioned above. Moreover, the optical pickup head usually has an initial position. When the optical disc drive is activated, the optical pickup head is moved to the initial position first, and then the optical pickup head is moved according to the step index from the initial position. The initial position can be a predetermined position, for example, the initial position can be set as the position 15 mm from the center of the optical disc. Therefore, the optical disc drive may obtain the present radial position of the optical pickup head according to the step index, the moving amount of each step number and the initial position.

In general, the step index is zero when the optical pickup head is located at the initial position. When the step index is negative, the optical pickup head moves from the initial position toward the center of the optical disc. When the step index is positive, the optical pickup head moves from the initial position towards the outer edge of the optical disc. Of course, the relationship between the moving direction of the optical pickup head and the signed value of the step index can also be set as the optical pickup head moving toward the center of the optical disc when the step index is positive, and the optical pickup head moving toward the outer edge of the optical disc when the step index is negative.

In addition, generally speaking, there is a spiral track on the data side surface of the optical disc. The manufacturers of optical discs pre-groove the address information on the tracks of the optical discs before the optical discs leave the factory. Therefore, the optical disc drive can read the current address information in the optical disc and calculates the radial position of the optical pickup head according to the address information. The optical discs with different specifications, for example, CD disc, DVD disc or DVD-RAM disc, respectively have the corresponding address information pre-grooved on the tracks of the optical discs.

Taking CD disc for example, time information is pre-grooved along the track from the inner circle to the outer circle as the address information. Therefore, by reading the present time information of the track via the optical pickup head, the present radial position of the optical pickup head is calculated. Since the address information of the optical discs with different specifications is known by people skilled in the art, the descriptions thereof are therefore not repeated herein. In general, the radial position of the optical pickup head calculated according to the address information of the optical disc is the radial distance between the optical pickup head and the center of the optical disc.

In the present invention, the position control method of the optical pickup head is mainly to adjust the position of the optical pickup head according to the difference between the position information obtained by the step index and the position information obtained by the address information read in the optical disc.

In the first embodiment of the present invention, the position information of the optical pickup head can be represented as the radial position of the optical pickup head.

As it is described above, the first radial position of the optical pickup head is obtained according to the step index and the initial position of the optical pickup head and is served as the first position information. Taking the moving amount of each step number is 6.25 μm and the initial position is the position 15 mm from the center of the optical disc for example, when the step index is 500, the optical pickup head 110 is moved 3.125 mm. That is to say, the first radial position (the first position information) of the optical pickup head is 18.125 mm (3.125 mm+15 mm=18.125 mm).

Next, the second radial position (the second position information) obtained by the address information read from the optical disc is compared with the first radial position, and then whether the difference between the first radial position and the second radial position is greater than a predetermined value is determined. Taking the predetermined value is 2 mm for example, if the second radial position obtained by the address information read from the optical disc is 18.5 mm, the difference between the first radial position and the second radial position is smaller than the predetermined value. At the time, the step index is updated, such that the radial position corresponding to the updated step index is the same as the second radial position. Taking it is described above for example, the updated step index is 560((18.5-15) mm/6.25 μm=560).

On the contrary, if the second radial position obtained by the address information read in the optical disc is 5.5 mm, the difference between the first radial position and the second radial position is greater than the predetermined value. At the time, the optical pickup head is moved to the initial position, and the step index is set as zero.

In the second embodiment of the present invention, the position information of the optical pickup head can be represented as the step index. At the time, the present step index of the optical disc drive is the first step index (the first position information).

Next, the radial position of the optical pickup head is obtained by the address information read from the optical disc. Then, the radial position is converted to the second step index (the second position information) according to the initial position and the moving amount of each step number of the optical pickup head. Taking the moving amount of each step number is 6.25 μm and the initial position is the position 15 mm from the center of the optical disc for example, if the radial position of the optical pickup head obtained according to the address information read from the optical disc is 18 mm, the corresponding second step index is 480.

Next, whether the difference between the first step index and the second step index is greater than a predetermined value is determined. Taking the predetermined value is 300 for example, if the first step index is 280, the difference between the first step index and the second step index is smaller than the predetermined value. At the time, the step index is updated, such that the updated step index is the same as the second step index, which means the step index is updated as 480.

On the contrary, if the first step index is 800, the difference between the first step index and the second step index is greater than the predetermined value. At the time, the optical pickup head is moved to the initial position, and the step index is set as zero.

In the present invention, the position information of the optical pickup head can be represented as the radial position of the optical pickup head or be represented as the step index. Or else, the position information of the optical pickup head can be represented as a defined value. The present invention does not limit the representing type of the position information of the optical pickup head, as long as the step index of the optical disc drive and the address information read from the optical disc can be converted to the same representing type, so as to compare the difference thereof for performing the following controlling steps, it is the scope of the present invention.

Figure 3:
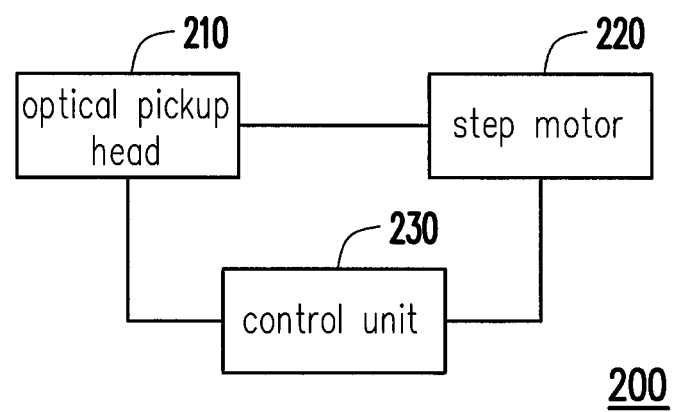
FIG. 3 illustrates a schematic block diagram of a position control system of an optical pickup head of an optical disc drive according to an embodiment of the present invention.

Referring to FIG. 3, FIG. 3 illustrates a schematic block diagram of a position control system of an optical pickup head of an optical disc drive according to an embodiment of the present invention. In the present embodiment, the position control system 200 of an optical pickup head includes an optical pickup head 210, a step motor 220 and a control unit. The control unit 230 controls the rotation amount of the step motor 220 according to the step index, such that the step motor 220 drives the optical pickup head 210 to move to a certain track on the optical disc. Next, the optical pickup head 210 reads the data on the certain track and transmits the read data to the control unit 230.

In the present embodiment of the present invention, the data read and transmitted to the control unit 230 by the optical pickup head 210 is the address information of the certain track. Next, the control unit 230 converts the received address information into a second position information of the optical pickup head. At the time, the control unit 230 converts the step index into a first position information of the optical pickup head. After that, the control unit 230 determines whether the difference between the first position information and the second position information is greater than a predetermined value. When the difference is not greater than the predetermined value, the control unit 230 updates the step index. When the difference is greater than the predetermined value, the control unit 230 controls the step motor 220 to rotate, such that the optical pickup head is moved to an initial position, and the step index is set as zero.

In sum, the present invention adjust the position of the optical pickup head according to the difference between the first position information and the second position information respectively obtained from the step index and the address information of the optical disc. Therefore, the excessive position deviation between the actual position of the optical pickup head and the position corresponding to the step index can be avoided, so that the accuracy of the position control of the optical pickup head can be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A position control method of an optical pickup head of an optical disc drive, wherein the optical disc drive has an optical pickup head for reading data on an optical disc and a step index for controlling the movement of the optical pickup head, the position control method comprises:
   calculating a first position information of the optical pickup head according to the step index;
   reading an address information from the optical disc, and calculating a second position information of the optical pickup head according to the address information;
   determining whether a difference between the first position information and the second position information is greater than a predetermined value;
   updating the step index when the difference is not greater than the predetermined value; and
   moving the optical pickup head to an initial position when the difference is greater than the predetermined value, and setting the step index as zero.

2. The position control method as claimed in claim 1, wherein when the optical disc drive is activated, the optical pickup head is moved to the initial position, and then the optical disc drive controls the optical pickup head to move from the initial position.

3. The position control method as claimed in claim 2, wherein when the optical pickup head is located at the initial position, the step index is zero.

4. The position control method as claimed in claim 1, wherein the first position information is a first radial position of the optical pickup head, and the first radial position is calculated according to the step index and the initial position.

5. The position control method as claimed in claim 4, wherein the second position information is a second radial position of the optical pickup head, and the second radial position is calculated according to the address information read from the optical disc.

6. The position control method as claimed in claim 5, wherein the step of updating the step index comprises: updating the step index, such that an updated radial position corresponding to the updated step index is the same as the second radial position.

7. The position control method as claimed in claim 1, wherein the first position information is a first step index and the first step index is defined as the step index.

8. The position control method as claimed in claim 7, wherein the second position information is a second step index, and the second step index is calculated according to the address information read from the optical disc and the initial position.

9. The position control method as claimed in claim 8, wherein the step of updating the step index comprises: updating the step index, so that the updated step index is the same as the second step index.

10. A position control system of an optical pickup head of an optical disc drive, the position control system comprises:
- an optical pickup head, reading an address information from an optical disc;
- a step motor, controlling the optical pickup head to move according to a step index; and
- a control unit, calculating a first position information of the optical pickup head according to the step index, and calculating a second position information according to the address information;
- wherein the control unit determines whether a difference between the first position information and the second position information is greater than a predetermined value, when the difference is not greater than the predetermined value, the step index is updated, and when the difference is greater than the predetermined value, the optical pickup head is moved to an initial position and the step index is set as zero.

11. The position control system as claimed in claim 10, wherein when the optical disc drive is activated, the optical pickup head is moved to the initial position, and then the control unit controls the optical pickup head to move from the initial position.

12. The position control system as claimed in claim 11, wherein when the optical pickup head is located at the initial position, the step index is zero.

13. The position control system as claimed in claim 10, wherein the first position information is a first radial position of the optical pickup head, and the first radial position is calculated according to the step index and the initial position.

14. The position control system as claimed in claim 13, wherein the second position information is a second radial position of the optical pickup head, and the second radial position is calculated according to the address information read from the optical disc.

15. The position control system as claimed in claim 14, wherein when the difference is not greater than the predetermined value, the step index is updated to an undated step index, such that an updated radial position corresponding to the updated step index is the same as the second radial position.

16. The position control system as claimed in claim 10, wherein the first position information is a first step index and the first step index is defined as the step index.

17. The position control system as claimed in claim 16, wherein the second position information is a second step index, and the second step index is calculated according to the address information read from the optical disc and the initial position.

18. The position control system as claimed in claim 17, wherein when the difference is not greater than the predetermined value, the step index is updated to an undated step index, such that the updated step index is the same as the second step index.

* * * * *